(12) United States Patent
Hao

(10) Patent No.: US 10,103,386 B2
(45) Date of Patent: Oct. 16, 2018

(54) ELECTRODE WITH MODIFIED CURRENT COLLECTOR STRUCTURE AND METHOD OF MAKING THE SAME

(71) Applicant: NISSAN NORTH AMERICA, INC., Franklin, TN (US)

(72) Inventor: Xiaoguang Hao, Burnsville, MN (US)

(73) Assignee: Nissan North America, Inc., Franklin, TN (US)

( * ) Notice: Subject to any disclaimer, the term of this patent is extended or adjusted under 35 U.S.C. 154(b) by 251 days.

(21) Appl. No.: 14/969,508

(22) Filed: Dec. 15, 2015

(65) Prior Publication Data

US 2017/0170483 A1    Jun. 15, 2017

(51) Int. Cl.
| | |
|---|---|
| *H01M 4/70* | (2006.01) |
| *H01M 4/66* | (2006.01) |
| *H01M 4/04* | (2006.01) |
| *H01M 10/0525* | (2010.01) |
| *H01M 4/134* | (2010.01) |

(52) U.S. Cl.
CPC .......... *H01M 4/70* (2013.01); *H01M 4/045* (2013.01); *H01M 4/134* (2013.01); *H01M 4/661* (2013.01); *H01M 10/0525* (2013.01)

(58) Field of Classification Search
CPC ........ H01M 4/70; H01M 4/045; H01M 4/661; H01M 10/0525
See application file for complete search history.

(56) References Cited

U.S. PATENT DOCUMENTS

| | | | |
|---|---|---|---|
| 7,713,645 B2 * | 5/2010 | Ryu | H01M 8/0247 429/507 |
| 8,338,019 B2 | 12/2012 | Lee et al. | |
| 8,669,008 B2 | 3/2014 | Cho et al. | |
| 8,808,919 B2 | 8/2014 | Kim | |
| 8,870,978 B2 | 10/2014 | Yun et al. | |
| 8,962,190 B1 * | 2/2015 | Gross | H01M 4/80 429/209 |

(Continued)

FOREIGN PATENT DOCUMENTS

| | | | |
|---|---|---|---|
| CN | 103779570 A | | 5/2014 |
| JP | 2003297353 A | | 10/2003 |

(Continued)

*Primary Examiner* — Jonathan G Jelsma
(74) *Attorney, Agent, or Firm* — Young Basile Hanlon & MacFarlane, P.C.

(57) ABSTRACT

Electrodes having three dimensional current collectors provide stability to the electrode structure, improved contact between active material and the current collector, and improved charge transfer. An electrode includes a three dimensional current collector including a substantially planar base and spring-like structures extending from the substantially planar base in spaced relation along the substantially planar base. Each spring-like structure has an attachment end attached to the substantially planar base and a free distal end. Active material is layered on the three dimensional current collector, the active material filled between the spring-like structures. The active material comprises alloying particles having a high specific capacity, wherein the spring-like structures deflect as the alloying particles expand in volume due to lithiation and return to an initial position as the alloying particles contract due to delithiation.

18 Claims, 2 Drawing Sheets

(56) References Cited

U.S. PATENT DOCUMENTS

| | | |
|---|---|---|
| 8,974,966 B2 | 3/2015 | Kim et al. |
| 9,005,819 B2 | 4/2015 | Kwon et al. |
| 2003/0235736 A1* | 12/2003 | Lin ................ H01M 4/12 320/112 |
| 2004/0226825 A1* | 11/2004 | Shiota ............. C25D 1/04 205/60 |
| 2005/0064291 A1* | 3/2005 | Sato ............... H01M 4/134 429/233 |
| 2007/0148550 A1 | 6/2007 | Hasegawa et al. |
| 2009/0269511 A1* | 10/2009 | Zhamu ............. B82Y 30/00 427/558 |
| 2010/0285358 A1* | 11/2010 | Cui ................ H01M 4/134 429/218.1 |
| 2011/0189510 A1* | 8/2011 | Caracciolo ........ H01M 4/0421 429/50 |
| 2012/0100432 A1* | 4/2012 | Matsumoto ......... H01M 4/78 429/245 |
| 2012/0313587 A1* | 12/2012 | Norton ............ C25D 5/18 320/128 |
| 2013/0032278 A1 | 2/2013 | Ottinger et al. |
| 2013/0164612 A1* | 6/2013 | Tanemura ......... H01M 4/70 429/211 |
| 2013/0260237 A1 | 10/2013 | Chang et al. |
| 2013/0330617 A1 | 12/2013 | Yoshimura et al. |
| 2014/0255742 A1 | 9/2014 | Kwon et al. |
| 2016/0226061 A1* | 8/2016 | Zheng ............. H01M 4/366 |

FOREIGN PATENT DOCUMENTS

| | | |
|---|---|---|
| JP | 2005293960 A | 10/2005 |
| WO | 2009141691 A2 | 11/2009 |
| WO | 2013021630 A1 | 2/2013 |

\* cited by examiner

ELECTRODE WITH MODIFIED CURRENT COLLECTOR STRUCTURE AND METHOD OF MAKING THE SAME

TECHNICAL FIELD

This disclosure relates to an electrode having a modified current collector structure and methods of making the same.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

To increase the theoretical lithium storage capacity, silicon has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

Disclosed herein are electrodes having three dimensional current collectors that provide stability to the electrode structure, improved contact between active material and the current collector, and improved charge transfer.

An embodiment of the electrodes disclosed herein comprises a three dimensional current collector including a substantially planar base and spring-like structures extending from the substantially planar base in spaced relation along the substantially planar base. Each spring-like structure has an attachment end attached to the substantially planar base and a free distal end. Active material is layered on the three dimensional current collector, the active material filled between the spring-like structures. The active material comprises alloying particles having a high specific capacity, wherein the spring-like structures deflect as the alloying particles expand in volume due to lithiation and return to an initial position as the alloying particles contract due to delithiation.

Another embodiment of an electrode comprises a current collector, spring-like structures extending from the current collector in spaced relation along a substantially planar surface of the current collector, each spring-like structure having an attachment end and a free distal end, and active material layered on the current collector, the active material filled between the spring-like structures, the active material comprising alloying particles having a high specific capacity. The spring-like structures deflect as the alloying particles expand in volume due to lithiation and return to an initial position as the alloying particles contract due to delithiation.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Because the carbon material used in electrodes of conventional batteries, such as lithium ion batteries or sodium ion batteries, suffers from a low specific capacity, the conventional battery has poor energy density even though there is small polarization and good stability. Furthermore, batteries having electrodes of graphite or other carbon materials develop increased internal resistance over time, which decreases their ability to deliver current.

To address the poor energy density of carbon based electrodes, alternative active materials with higher energy densities are desired. Alloying particles such as silicon, tin, germanium and their oxides and alloys are non-limiting examples of materials that may be added to an electrode active material layer to improve its energy density, among other benefits.

One particular example is the use of silicon in lithium-ion batteries. Electrode materials such as silicon react with lithium via a different mechanism than graphite. Lithium forms alloys with silicon materials, which involves breaking the bonds between host atoms, causing dramatic structural changes in the process. Since the silicon does not constrain the reaction, anode materials that form alloys can have much higher specific capacity than intercalation electrode materials such as graphite. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) and structural changes due to lithium insertion. Volume expansion of silicon can cause particle cracking and pulverization when the silicon has no room to expand, which leads to delamination of the active material from the current collector, electrical isolation of the fractured or pulverized active material, capacity fade due to collapsed conductive pathways, and increased internal resistance over time.

Disclosed herein are electrodes configured to address the issues discussed above by improving contact between the active material and the current collector, improving the charge transfer, improving the electrode's mechanical stability and buffering the current collector and the active material against stress. The electrodes disclosed herein incorporate spring-like structures extending from the current collector to effectively create a three dimensional current collector, with the spring-like structures increasing the surface area of the current collector main body and acting as a buffer between the active material and the current collector planar main body.

Figure 1:
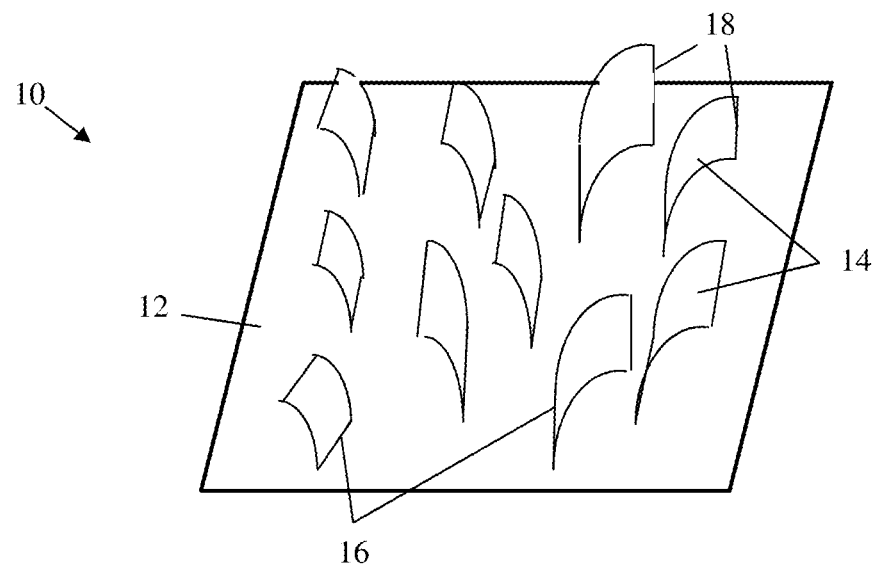
FIG. 1 is a top perspective view of a three dimensional current collector used in electrodes as disclosed herein.

FIG. 1 is a perspective view of an embodiment of a three dimensional current collector 10. The three dimensional current collector 10 has a substantially planar base 12 and spring-like structures 14 extending from the substantially planar base 12 in spaced relation along the substantially planar base 12. Each spring-like structure has an attachment end 16 attached to the substantially planar base 12 and a free distal end 18. As used herein, "substantially planar" means that the largest surface of the current collector is basically planar. The surface can have a topography that includes flat, smooth, rough, dimples, and the like as desired or required.

As illustrated in FIG. 1, the spring-like structures 14 can be shaped substantially as a sheet of material that has a natural flex to it when standing on its attachment end 16. The spring-like structures 14 can be substantially the same size or can be varying sizes as illustrated. The orientation of the spring-like structures 14 is varied while a density of the spring-like structures along the substantially planar base 12 is uniform. For example, the density of the spring-like structures can be about 50 spring-like structures per $cm^2$. Alternatively, the orientation can be uniform as well. The spring-like structures 14 can have a width of between about five to eight microns and a height of between about ten to twenty microns. However, the shape and size of the spring-like structures 14 can be other non-limiting examples, so long as the spring-like structure provides the characteristics of a spring that will result in the advantages noted above.

The spring-like structures 14 can be formed by electrodeposition on the substantially planar base 12 and can be the same material as the substantially planar base 12. As a non-limiting example, the substantially planar base 12 and the spring-like structures 14 can both be copper, both be nickel or any other material known to those skilled in the art having current collector properties. The spring-like structures 14 increase a surface area of the substantially planar base 12 that is in contact with the active material of the electrode.

The spring-like structures 14 can be formed as flexible sheets of metal, the flexible sheets bent due to flex such that the free distal ends 18 of the spring-like structures 14 are oblique to the substantially planar base 12 as illustrated. The flexible sheets can be attached to the substantially planar base 12 of the current collector 10 by conductive adhesive, as a non-limiting example.

Figure 2A:
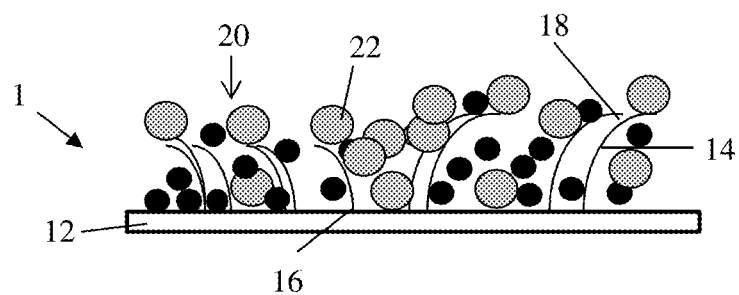
FIG. 2A is a side schematic view of an electrode using the current collector disclosed in FIG. 1, the alloying particles in an unexpanded state.
Figure 2B:
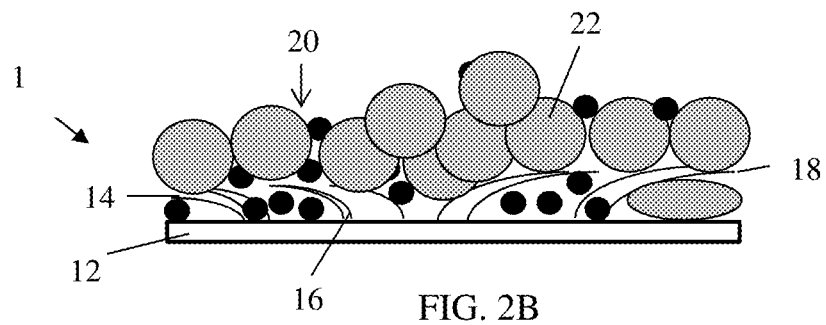
FIG. 2B is FIG. 2A with the alloying particles expanded due to lithiation.

As illustrated in FIGS. 2A and 2B, the electrode 1 includes an active material 20 layered on the three dimensional current collector 10, some filling between the spring-like structures 14 and others resting on the spring-like structures 14. The active material 20 comprises alloying particles 22 having high specific capacities. As non-limiting examples, silicon, tin and germanium each have a high specific capacity for lithium ions. As discussed above, this high capacity for lithium ions results in large volume expansions of the alloying particles 22. As illustrated in FIG. 2B, the spring-like structures 14 deflect as the alloying particles 22 expand in volume due to lithiation and, illustrated in FIG. 2A, return to an initial position as the alloying particles 22 contract due to delithiation. This deflection and return by the spring-like structures 14 effectively act as a buffer between the active material and the current collector planar main body 12, reducing the shearing effect of the expansion and effectively maintaining contact between the current collector 12 and the active material 20. As illustrated, the free distal end 18 of each spring-like structure 14 is forced toward the substantially planar base 12 of the current collector 12 during expansion of the alloying particles 22. The spring-like structures are biased toward the upright position, i.e., the free distal end 18 is biased away from the substantially planar base 12, so when the alloying particles 22 contract when undergoing delithiation, the spring-like structures 12 are biased back to the upright position.

Figure 3A:
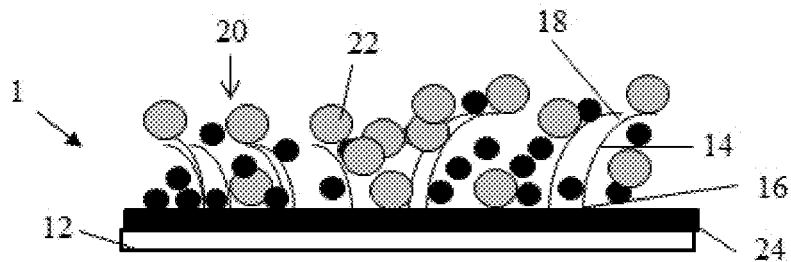
FIG. 3A is a side schematic view of another electrode using the current collector disclosed in FIG. 1, the alloying particles in an unexpanded state.
Figure 3B:
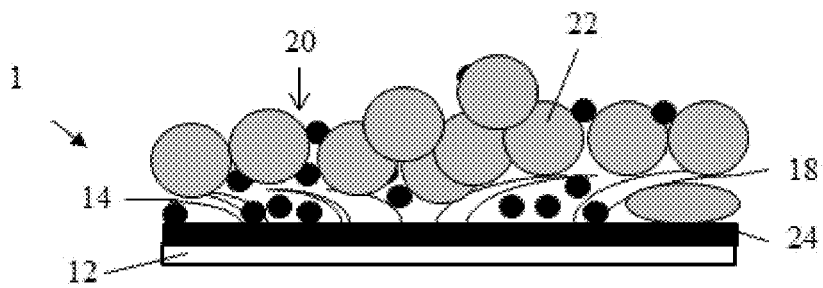
FIG. 3B is FIG. 3A with the alloying particles expanded due to lithiation.

As illustrated in FIGS. 3A and 3B, the electrode 1 can further include a buffer material 24 coated on the substantially planar base 12 between the substantially planar base 12 and the active material 20. The buffer material 24 is a conductive material that further buffers the substantially planar base 12 from shearing and other damage due to expansion of the alloying particles 22. The buffer material 24 can be, as non-limiting examples, graphite, graphene, carbon powder, carbon nanotubes, metal polymer, and conductive polymer. The spring-like structures 14 can be attached to the conductive buffer material 24 or can be attached to the substantially planar base 12 of the current collector 10 and extend through the buffer material 24.

Figure 4:
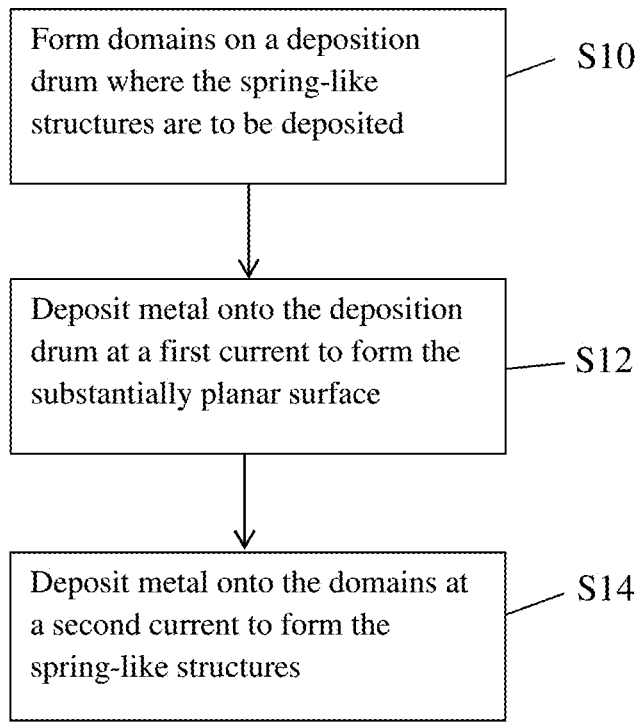
FIG. 4 is a flow diagram of a method of manufacturing the three dimensional current collector of FIG. 1.

The three dimensional current collector 10 can be manufactured with electrodeposition. For example, as shown in the flow diagram of FIG. 4, in step S10, domains are formed on a deposition drum by electrodeposition of a mixed solution of, as a non-limiting example, copper sulfate. The deposition drum has a smooth surface with local domains of copper crystalline. The domains representing where the spring-like structures 14 are to be formed on the substantially planar base 12. The domains are created based on the shape of the desired final spring-like structures 14. For example, to form the sheets illustrated, the domain would resemble the attachment end 16 of a sheet. Metal, such as copper, is electrodeposited onto the deposition drum at a first current to form the substantially planar base 12 along the deposition drum surface in step S12 to form the foil current collector. In step S14, which occurs concurrently with step S12, the spring-like structures 14 are selectively deposited on the copper rich region on the deposition drum. For example, the metal is electrodeposited at the site of each domain at a second current higher than the first current to form the spring-like structures 14. The second current is selected depending on the desired height of the spring-like structures 14.

As described herein, the methods and systems include a series of steps. Unless otherwise indicated, the steps described may be processed in different orders, including in parallel. Moreover, steps other than those described may be included in certain implementations, or described steps may be omitted or combined, and not depart from the teachings herein. The use of the term "collecting" is not meant to be limiting and encompasses both actively collecting and receiving data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A or B, X can include A alone, X can include B alone or X can include both A and B. In addition, the articles "a" and "an" as used in this application and the appended claims should generally be construed to mean "one or more" unless specified otherwise or clear from context to be directed to a singular form.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

Also disclosed are methods of manufacturing the three dimensional current collector. One method includes forming domains on a deposition drum where the spring-like structures are desired, electrodepositing a metal on the deposition drum at a first current to form the substantially planar base, and electrodepositing the metal on the domains at a second current to form the spring-like structures, the second current being higher than the first current.

Other embodiments or implementations may be within the scope of the following claims.

What is claimed is:

1. An electrode comprising:
   a three-dimensional current collector comprising:
      a substantially planar base without apertures; and
      spring-like structures extending from the substantially planar base in spaced relation along the substantially planar base, each spring-like structure formed from a flexible metal sheet having an attachment end attached to the substantially planar base, the flexible metal sheet having an initial shape being curved such that a free distal end is oblique to the substantially planar base; and
   active material layered on the three-dimensional current collector, the active material filled between the spring-like structures, the active material comprising alloying particles having a high specific capacity, wherein the spring-like structures are deflected toward the substantially planar surface as the alloying particles expand in volume due to lithiation and return to the initial position as the alloying particles contract due to delithiation.

2. The electrode of claim 1, wherein the spring-like structures are formed by electrodeposition on the substantially planar base the substantially planar base formed of the same metal as the flexible metal sheet.

3. The electrode of claim 2, wherein the metal is copper.

4. The electrode of claim 2, wherein the spring-like structures increase a surface area of the substantially planar base that is in contact with the active material.

5. The electrode of claim 1, wherein the spring-like structures have a width of between about five to eight microns and a height of between about ten to twenty microns.

6. The electrode of claim 1, wherein an orientation of flexible metal sheets is varied while a density of the flexible metal sheets along the substantially planar base is uniform.

7. The electrode of claim 1, further comprising a buffer material coated on the substantially planar base between the substantially planar base and the active material, the buffer material being conductive.

8. The electrode of claim 1, wherein the alloying particles comprise one or more of silicon, tin and germanium.

9. A method of manufacturing the three-dimensional current collector of claim 1, comprising:
   forming domains on a deposition drum where the spring-like structures are desired;
   electrodepositing a metal on the deposition drum at a first current to form the substantially planar base; and
   electrodepositing the metal on the domains at a second current to form the spring-like structures, the second current being higher than the first current.

10. The method of claim 9, wherein the metal is copper.

11. The method of claim 9, wherein the domain is shaped to form the attachment end of the spring-like structures.

12. A battery having an electrode comprising:
    a current collector;
    spring-like structures extending from the current collector in spaced relation along a substantially planar surface of the current collector, each spring-like structure having an attachment end and a free distal end, each spring-like structure formed of a flexible metal in sheet form; and
    active material layered on the current collector, the active material filled between the spring-like structures, the active material comprising one or more of silicon, tin and germanium alloying particles having a high specific capacity, wherein, for each battery cycle, the free distal end of each spring-like structure is deflected toward the current collector by an amount greater than 45° from an initial position as the alloying particles expand in volume due to lithiation and return to the initial position as the alloying particles contract due to delithiation.

13. The electrode of claim 12, wherein the spring-like structures are formed of sheets of a flexible, conductive material, the attachment end of the spring-like structures attached to the substantially planar surface of the current collector with conductive adhesive, the sheets bent due to flex such that the free distal ends of the spring-like structures are oblique to the substantially planar surface.

14. The electrode of claim 13, wherein the spring-like structures have a width of between about five to eight microns and a height of between about ten to twenty microns.

15. The electrode of claim 12, wherein an orientation of the spring-like structures is varied while a density of the spring-like structures along the substantially planar surface is uniform.

16. The electrode of claim 15, wherein the density is 50 spring-like structures per $cm^2$.

17. The electrode of claim 12, further comprising a conductive buffer layer coated on the substantially planar surface of the current collector, the spring-like structures attached to the conductive buffer layer.

18. The electrode of claim 12, wherein the attachment end of the spring-like structures is attached directly to the substantially planar surface of the current collector.

* * * * *